(12) United States Patent
Kose

(10) Patent No.: US 6,764,129 B2
(45) Date of Patent: Jul. 20, 2004

(54) PLASTIC WINDOW PANEL

(75) Inventor: Akira Kose, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 54 days.

(21) Appl. No.: 09/972,412

(22) Filed: Oct. 6, 2001

(65) Prior Publication Data

US 2002/0041114 A1 Apr. 11, 2002

(30) Foreign Application Priority Data

Oct. 10, 2000 (JP) ........................................ 2000-309020
Oct. 10, 2000 (JP) ........................................ 2000-309021

(51) Int. Cl.[7] ................................................ B60J 7/00
(52) U.S. Cl. ........................... 296/146.15; 296/901.01; 296/216.09; 52/208
(58) Field of Search ......................... 296/84.1, 146.15, 296/200, 901.01, 216.01, 216.09, 901; 52/208

(56) References Cited

U.S. PATENT DOCUMENTS 2,060,104 A * 11/1936 Moulton ..................... 296/84.1
2,953,961 A * 9/1960 Court ......................... 296/200
2,963,936 A * 12/1960 Court ..................... 296/146.15
4,839,989 A * 6/1989 McConnell ................... 49/171
5,419,088 A * 5/1995 Raymond ......................... 52/1
5,815,848 A * 10/1998 Jarvis ............................. 2/424

FOREIGN PATENT DOCUMENTS

DE 3545887 * 7/1987 ................... 52/208
JP 63-240423 10/1988 ............... B60J/1/02
JP 2000-108681 4/2000 ............ B60J/10/02

* cited by examiner

Primary Examiner—Dennis H. Pedder
(74) Attorney, Agent, or Firm—Morgan & Finnegan, LLP

(57) ABSTRACT

A plastic sun roof panel has a central portion formed in a maximum and uniform thickness. Further, a mounting portion having a minimum and uniform thickness is formed annularly along a peripheral edge portion. Between the central portion and the peripheral edge portion, there is annularly formed a tapered portion whose thickness is gradually reduced from the central portion toward the mounting portion. A reinforcing member is arranged so as to extend along the peripheral edge portion of the sun roof panel, and is fastened to the plastic sun roof panel by means of an adhesive. A flange of the reinforcing member is fitted into a weather strip. In the peripheral edge portion, the tapered portion is situated on the inner side of the mounting portion to which the adhesive is applied.

9 Claims, 5 Drawing Sheets

---- PRIOR ART
—— PRESENT INVENTION

---- PRIOR ART (VIRTUAL THICKNESS)
—— PRESENT INVENTION

MOUNTING PORTION ↔ EFFECTIVE VIEW PORTION

SMALL ←THICKNESS→ LARGE

PLASTIC WINDOW PANEL

BACKGROUND OF THE INVENTION

1. Field of the Invention

This invention relates to a plastic window panel and, in particular, to a plastic window panel for use in an automotive sun roof.

2. Description of the Related Art

In an automotive sun roof structure, to be in conformity with a reduction in vehicle weight, a sun roof panel consisting of a plastic window panel is used. FIGS. 12 and 13 show an inner slide type sun roof structure in which a plastic sun roof panel 1 moves in the direction of the arrow to be tucked away under a roof 5. Both of the drawings show a state in which the plastic sun roof panel 1 is tucked away, with a roof window 6 provided in the roof 5 being open.

The plastic sun roof panel 1 is a substantially rectangular plate-like member having a uniform thickness and formed of a transparent resin material.

Generally speaking, as compared with a glass panel, the sun roof panel 1 has a lower flexural rigidity and a lower torsional rigidity, so that it is subject to deformation.

When the vehicle runs at high speed, with the roof window 6 being closed, a peripheral edge portion 1a of the plastic sun roof panel 1 undergoes deformation due to the upward attracting force generated by the airflow over the vehicle body. In view of this, a reinforcing member 2 is joined to the plastic sun roof panel 1 by an adhesive 4 so as to extend along the peripheral edge portion 1a of the panel, thereby enhancing the flexural rigidity and torsional rigidity of the plastic sun roof panel 1. Further, the peripheral edge portion of the reinforcing member 2 is bent into an L-shape to form a flange 2a. A weather strip 3, into which the flange 2a is fitted, serves as a seal between the roof window 6 and the plastic sun roof panel 1 when the roof window 6 is closed, preventing intrusion of water into the interior and leakage of air therefrom.

It is to be noted, however, that when heated by sunlight, the plastic sun roof panel 1 exhibits a tendency to expand in the planar direction, which is parallel to the panel surface. However, since the peripheral edge portion 1a of the plastic sun roof panel 1 is glued and secured to the reinforcing member 2, the expansion in the planar direction is significantly restrained. As a result, as indicated by the dotted line in FIG. 13, the plastic sun roof panel 1 undergoes a thermal deformation such that it is arcuately swelled in the vertical direction which is perpendicular to the panel surface.

For the plastic sun roof panel 1 to be tucked away under the roof 5 when opening the roof window 6, it is necessary to secure a gap c between the plastic sun roof panel 1 and the roof 5, taking into consideration the amount d by which the plastic sun roof panel 1 is vertically deformed by heat. Thus, the larger the thermal deformation amount d, the lower the ceiling 8 of the interior, which means it is difficult to ensure a sufficient head clearance hc between the head 7 of the passenger and the ceiling 8.

SUMMARY OF THE INVENTION

This invention has been made with view toward solving the above problem in the prior art. It is accordingly an object of this invention to provide a plastic window panel which makes it possible to reduce the thermal deformation and to enlarge the head clearance between the passenger head and the ceiling.

In accordance with this invention, there is provided a plastic window panel comprising a mounting portion defined in a peripheral edge portion and used to mount the panel to a vehicle body, a thin-walled portion which is nearer to a center than the mounting portion, and a central portion defined nearer to the center than the thin-walled portion, wherein the thin-walled portion has a smaller thickness than the central portion.

Further, in accordance with this invention, there is provided a plastic window panel comprising a mounting portion defined in a peripheral edge portion and used to mount the panel to a vehicle body, and an effective view portion having a transparent portion defined on the inner side of the mounting portion, wherein the effective view portion includes a peripheral portion whose thickness is smaller than a virtual thickness necessary for maintaining a predetermined face rigidity in a central portion in the case of a uniform thickness, and the central portion whose thickness is larger than the virtual thickness by an amount compensating for a reduction in face rigidity due to the reduction in the thickness of the peripheral portion.

DESCRIPTION OF THE PREFERRED EMBODIMENTS

Embodiments of this invention will now be described with reference to the drawings.

Embodiment 1

Figure 1:
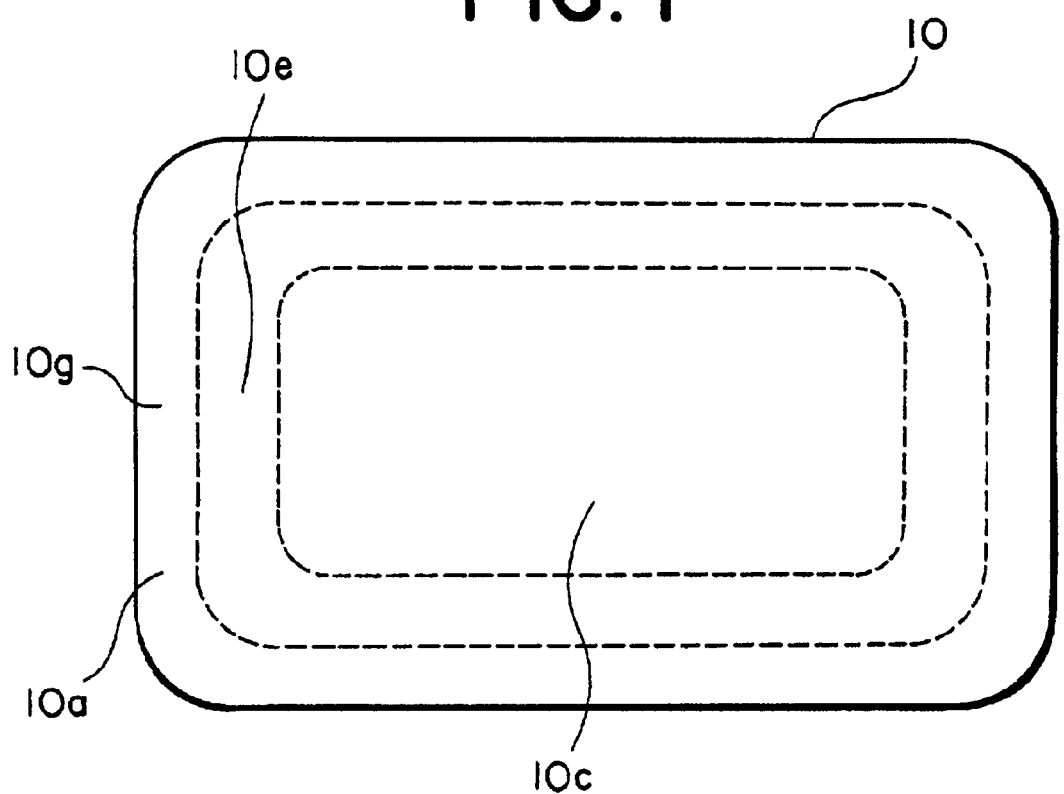
FIG. 1 is a plan view of a sun roof panel according to Embodiment 1 of this invention.

As shown in FIG. 1, a sun roof panel 10, which is a window panel according to Embodiment 1 of this invention, is a substantially rectangular plate-like member formed of a transparent material, such as polycarbonate. A central portion 10c of the sun roof panel 10, which is the thickest portion, has a uniform thickness. Further, an annular mounting portion 10g, which is the thinnest portion, has a uniform thickness and extends along a peripheral edge portion 10a. Between the central portion 10c and the peripheral edge portion 10a, there is formed an annular tapered portion 10e whose thickness gradually decreases from the central portion 10c toward the mounting portion 10g.

Figure 2:
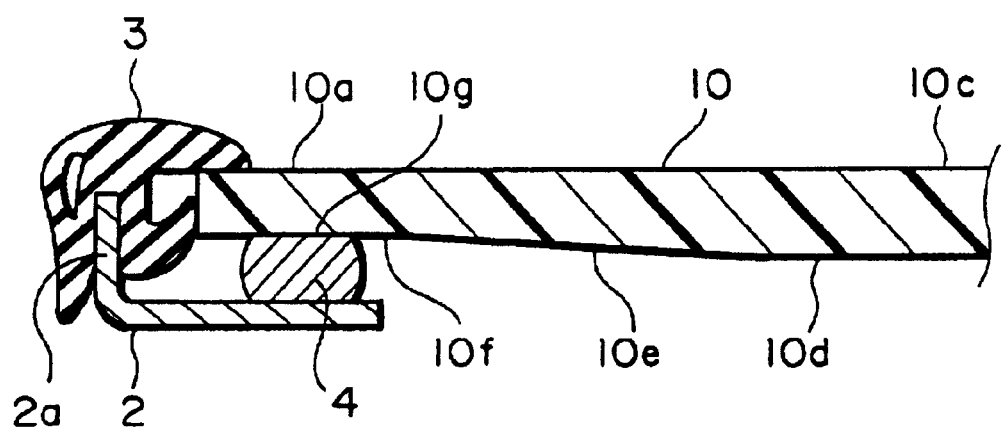
FIG. 2 is a sectional view showing a sun roof structure using the sun roof panel of Embodiment 1.

FIG. 2 shows a sun roof panel mounting structure using the sun roof panel 10 of this invention.

In the drawing, a reinforcing member 2 is arranged to extend along the peripheral edge portion 10a of the sun roof panel 10, and is fastened to the sun roof panel 10 by means of an adhesive 4.

That is, of the peripheral edge portion 10a of the sun roof panel 10, the portion to which the adhesive 4 is applied constitutes the mounting portion 10g to which the reinforcing member 2 is fastened. The tapered portion 10e constitutes a thin-walled portion thinner than the central portion on the center side with respect to the mounting portion 10g.

Figure 3:
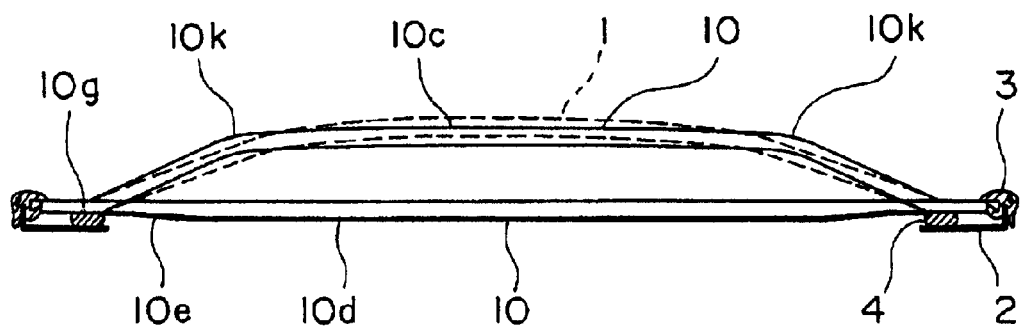
FIG. 3 is a diagram showing how the sun roof panel of Embodiment 1 and a conventional sun roof panel undergo thermal deformation.

Next, the operation of the sun roof panel 10 of this invention will be described with reference to FIG. 3.

When the sun roof 10 undergoes thermal deformation as a result of being heated by sunlight, the sun roof panel 10 is warped vertically, and exhibits a substantially trapezoidal configuration in side view, having points of inflection 10k near the mounting portion 10g, as indicated by the solid lines.

By contrast, when the conventional sun roof panel 1 undergoes thermal deformation as a result of being heated by sunlight, the surface of the sun roof panel 1 is warped so as to be arcuate in side view, as indicated by the dotted lines.

In the sun roof panel 10 of the present invention, the thermal deformation amount near the mounting portion 10g is larger than in the conventional sun roof panel 1, whereas in the central portion 10c, where the thermal deformation ought to be maximum, the thermal deformation amount is smaller than in the conventional sun roof panel 1. As a result, it is possible to reduce the maximum thermal deformation amount.

In this way, the tapered portion 10e is situated on the center side with respect to the mounting portion 10g, so that when the sun roof panel 10 is warped as a result of thermal deformation, the sun roof panel 10 is deformed so as to form the points of inflection 10k near the mounting portion 10g, so that it is possible to reduce the thermal deformation amount of the central portion 10c.

Further, the mounting portion log has a uniform thickness, so that, as compared with the case in which the mounting portion log is also tapered, the thickness of the adhesive 4 can be controlled more easily.

Embodiment 2

Figure 4:
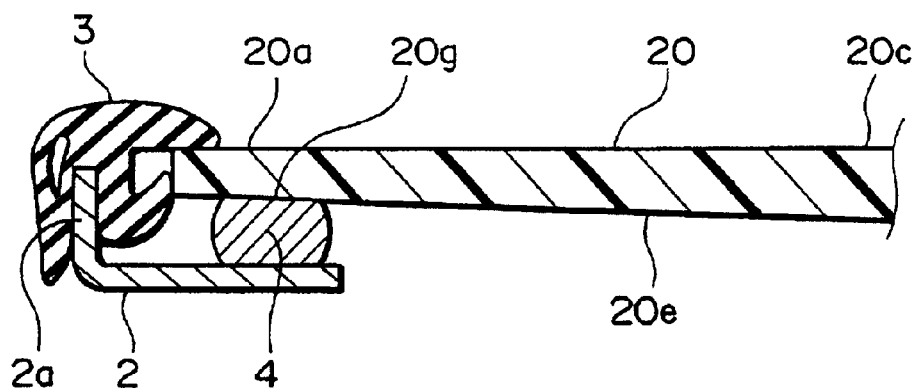
FIG. 4 is a sectional view showing a sun roof structure using a sun roof panel according to Embodiment 2.

As shown in FIG. 4, the configuration of a back surface 20e of a sun roof panel 20 according to this embodiment is different from that of the sun roof panel 10 of Embodiment 1 shown in FIG. 2.

The thickness of the sun roof panel 20 is maximum in a central portion 20c and minimum in a peripheral edge portion 20a, tapering being continuously effected from the central portion 20c toward the peripheral edge portion 20a.

In this way, tapering is effected from the central portion 20c toward the peripheral edge portion 20a, so that, as compared with the conventional sun roof panel 1, the thermal deformation amount on the center side near the mounting portion 20g is increased, whereby it is possible to reduce the thermal deformation amount in the central portion 20c, where the thermal deformation amount ought to be maximum.

Further, unlike Embodiment 1, this embodiment adopts a structure in which tapering is continuously effected up to the mounting portion 20g, whereby no stress concentration occurs and an increase in strength is achieved.

Embodiment 3

Figure 5:
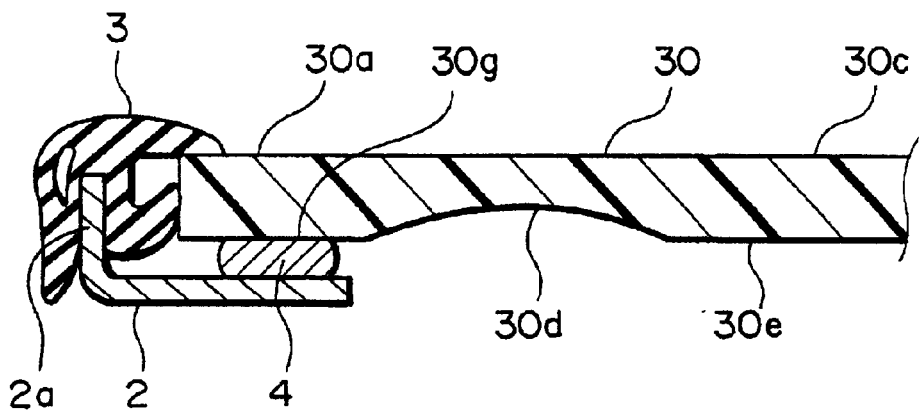
FIG. 5 is a sectional view showing a sun roof structure using a sun roof panel according to Embodiment 3.

As shown in FIG. 5, the configuration of a back surface 30e of a sun roof panel 30 according to this embodiment is different from that of the sun roof panel 10 of Embodiment 1 shown in FIG. 2.

The sun roof panel 30 is a substantially rectangular plate-like member having a uniform thickness. However, in the back surface 30e at a position near the mounting portion 30g to which the adhesive 4 is applied and on the center side, there is provided a recess 30d having an arcuate sectional configuration and extending all around substantially in a rectangular form.

In this way, the recess 30d is provided near the mounting portion 30g and on the center side, so that, as compared with the conventional sun roof panel 1, the thermal deformation amount near the mounting portion 30g and on the center side is increased, whereby it is possible to reduce the thermal deformation amount in the central portion 30c, where the thermal deformation amount ought to be maximum.

Further, in this embodiment, as compared with Embodiments 1 and 2, the preparation of the mold is facilitated.

Further, it is also possible to additionally provide the recess 30d of Embodiment 3 in the tapered portion 10e of the sun roof panel 10 of Embodiment 1 or in the back surface 20e of the sun roof panel 20 of Embodiment 2.

The sectional configuration of the recess 30d of the sun roof panel 30 is not restricted to an arcuate one. It is also possible to adopt some other configurations, such as a U-shaped or a V-shaped groove, as long as it helps to reduce the maximum thermal deformation amount. Further, it is not necessary for the thin walled portion to be formed so as to extend all around the sun roof panel as long as it can reduce the maximum thermal deformation amount. It is also possible to provide mounting portions in two opposed edge portions, forming strip-like thin-walled portion respectively between each of the mounting portions and the central portion.

The configuration of the thin-walled portion is not restricted to the above-described one. Any configuration will do as long as points of inflection are formed near the mounting portions of the sun roof panel and on the center side at the time of the generation of thermal deformation to make it possible to reduce the maximum thermal deformation amount.

Further, the sun roof panel of this invention is also applicable to a sun roof structure in which no reinforcing member is provided in the peripheral edge portion of the sun roof panel as long as the peripheral edge portion of the sun roof panel is secured in position and planar expansion as a result of thermal deformation is restrained.

Embodiment 4

Figure 6:
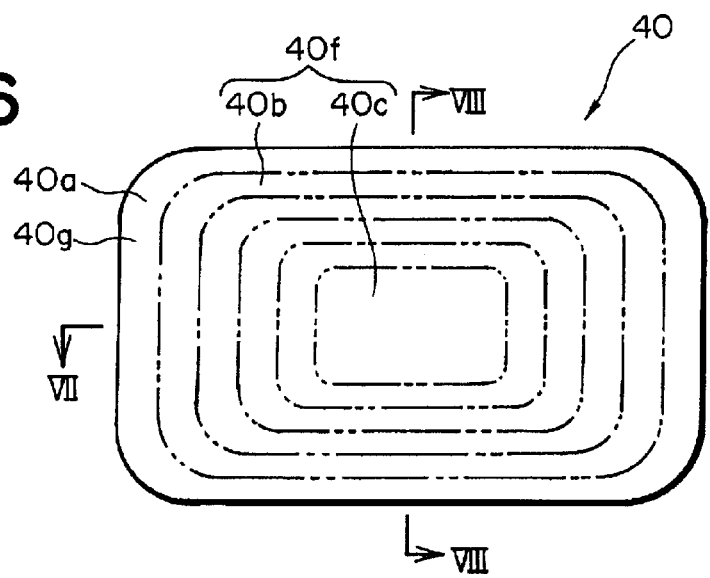
FIG. 6 is a plan view showing a plastic window panel according to Embodiment 4.

As shown in FIG. 6, a plastic window panel 40 according to this embodiment is a substantially rectangular plate-like member formed of a transparent resin material, such as polycarbonate. The thickness of the plastic window panel 40 is maximum in a central portion 40c, and continuous tapering is effected in a peripheral portion 40b from the central portion 40c toward a peripheral edge portion 40a. The two-dot chain lines in FIG. 6 are respectively lines connecting portions of the same thickness. In all directions, the thickness is lessened continuously and at a fixed ratio from the central portion 40c toward the peripheral edge portion 40a.

Figure 8:
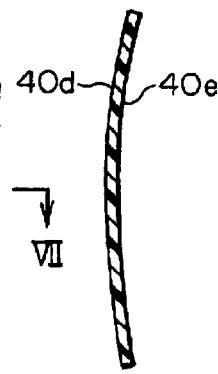
FIG. 8 is a sectional view taken along the line VIII—VIII of FIG. 6.
Figure 7:
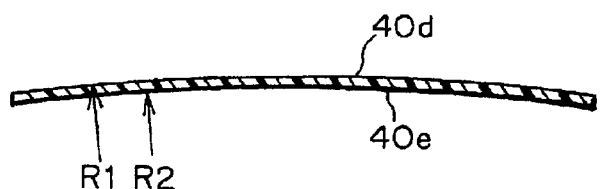
FIG. 7 is a sectional view taken along the line VII—VII of FIG. 6.

As shown in FIGS. 7 and 8, both the front surface 40d and the back surface 40e of the plastic window panel 40 form smooth curved surfaces warped in the same direction. By making the radius of curvature R2 of the back surface 40e larger than the radius of curvature R1 of the front surface 40d, a configuration is obtained in which the thickness is maximum in the central portion 40c and in which tapering is effected in the peripheral portion 40b from the central portion 40c toward the peripheral edge portion 40a.

Figure 11:
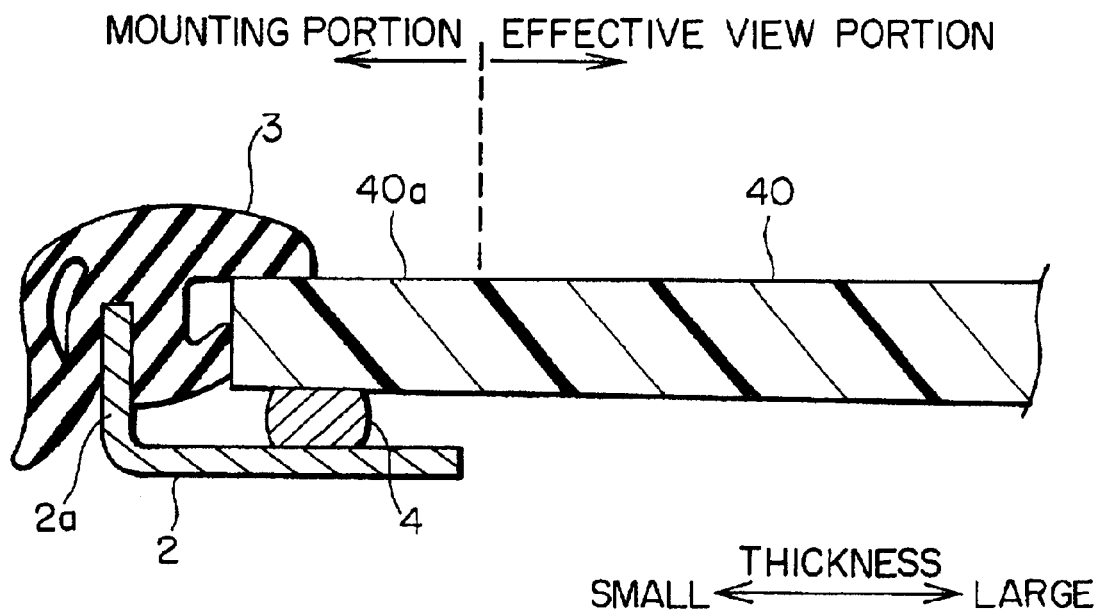
FIG. 11 is a sectional view showing a sun roof structure using the plastic window panel of Embodiment 4.

FIG. 11 shows a sun roof mounting structure using the plastic window panel 40 of this invention.

In the drawing, the reinforcing member 2 is arranged so as to extend along the peripheral edge portion 40a of the plastic window panel 40, and is fastened to the plastic window panel 40 by means of the adhesive 4. The peripheral edge portion of the reinforcing member 2 is bent into an L-shape to form a flange 2a, which is fitted into the weather strip 3. Further, the peripheral edge portion 40a of the plastic window panel 40 is slidably supported on a vehicle body (not shown) through the intermediation of the reinforcing member 2. That is, in the peripheral edge portion 40a of the plastic window panel 40, there is formed a mounting portion 40g mounted to and supported by the vehicle body through the intermediation of the reinforcing member 2. On the inner side of the mounting portion 40g, there is formed an effective view portion 40f which is not covered with the reinforcing member 2 and which consists of a transparent portion providing the outside view of the vehicle.

Next, the operation of the plastic window panel 40 of this invention will be described with reference to FIGS. 9 and 10 while comparing it with the conventional plastic window panel 1 with a uniform thickness shown in FIG. 14.

Figure 14:
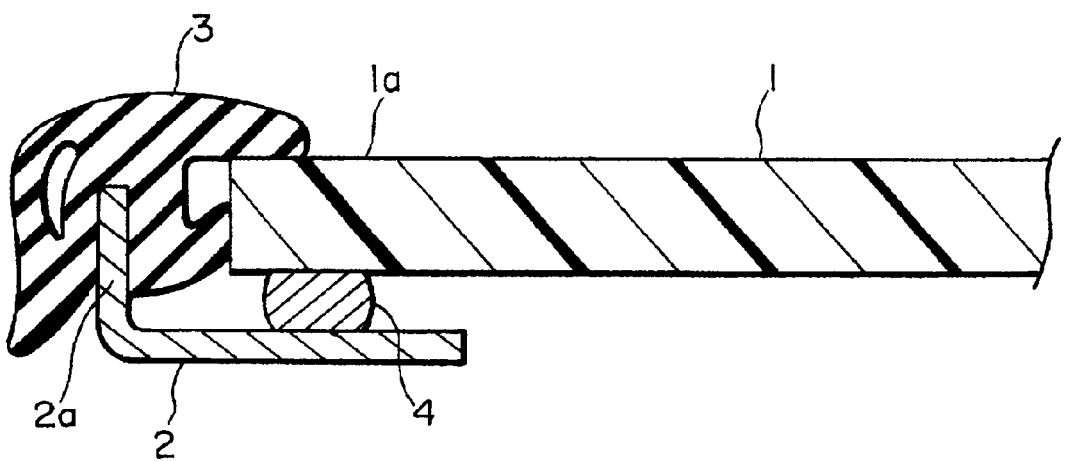
FIG. 14 is an enlarged side sectional view of a peripheral edge portion of the sun roof using the conventional roof panel.
Figure 12:
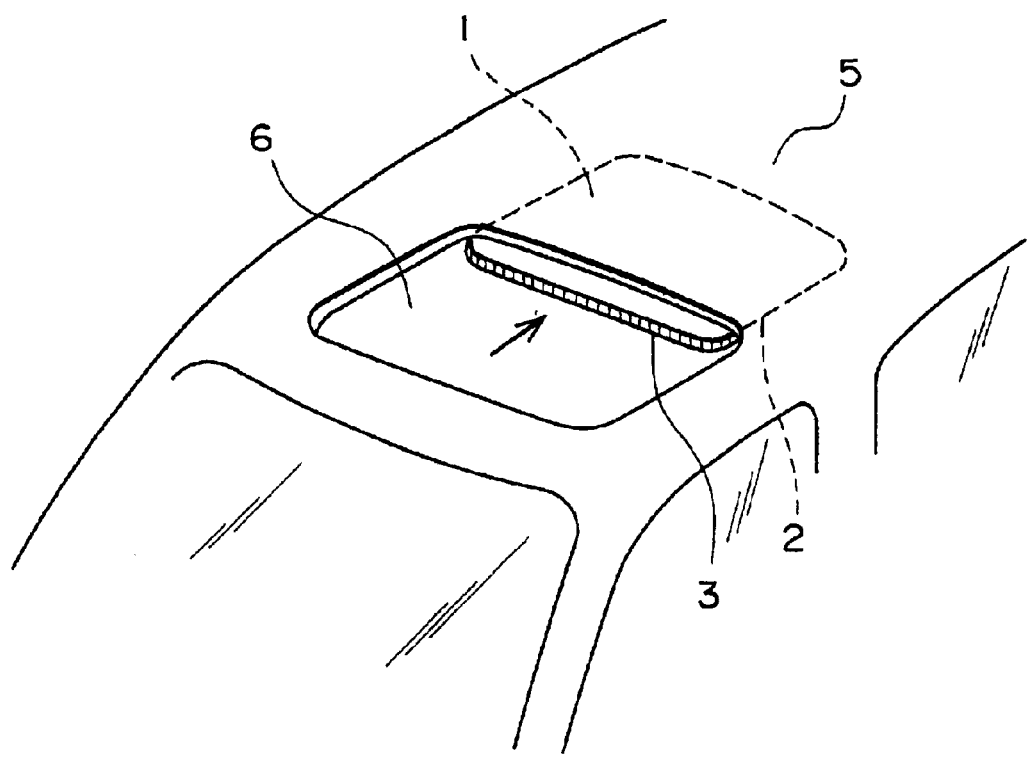
FIG. 12 is a perspective view showing a sun roof structure using a conventional sun roof panel.
Figure 13:
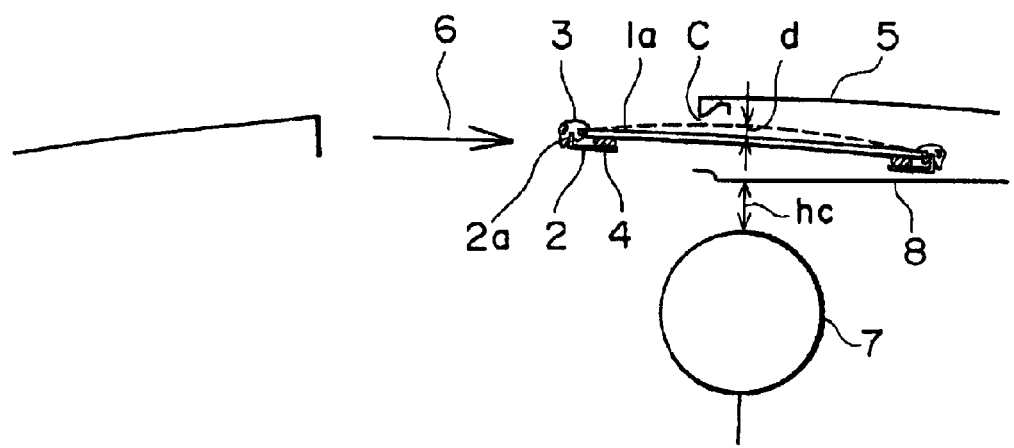
FIG. 13 is a side sectional view showing the sun roof structure using the conventional sun roof panel.

First, in the conventional window panel 1 shown in FIG. 14, a thickness to ensure the requisite face rigidity is required, and the thickness is uniform over the entire area of the window panel. When a predetermined load vertical to the panel is applied to the panel, with the peripheral edge portion of the window panel being supported, the portion where the load is applied undergoes distortion. The face rigidity is determined by this distortion. The less the distortion, the higher the face rigidity.

In the plastic window panel 1 whose thickness is uniform, the face rigidity of the peripheral portion is higher than necessary as compared with the face rigidity of the central portion. That is, when a predetermined vertical load is applied to the central portion of the plastic window panel 1, the plastic window panel 1 is distorted greatly, whereas the distortion occurs to a smaller degree when the same load is applied to the peripheral portion. In this way, the farther from the central portion, or the nearer to the peripheral edge portion 1a, the less the distortion.

Thus, in the plastic window panel 1 having a uniform thickness, the face rigidity is determined to be at such a level as will ensure the requisite face rigidity of the central portion. As a result, the thickness is such that the face rigidity in the peripheral portion is higher than necessary.

Figure 9:
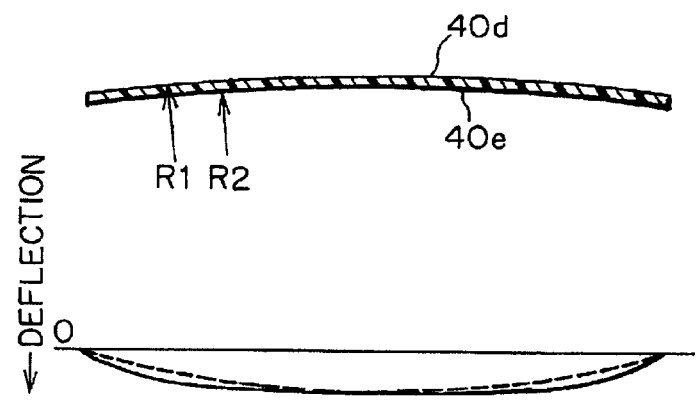
FIG. 9 is a graph in which this embodiment is compared with a conventional plastic window panel in terms of distortion.

It is to be noted that in the plastic window panel 40 of this invention, indicated by the solid line in FIG. 9, the distortion in the central portion 40c, where the face rigidity is lowest, occurs to the same degree as in the conventional plastic window panel 1 of the same size and a uniform thickness, indicated by the dotted line. On the other hand, in the plastic window panel 40, whose thickness is smaller in the peripheral portion, the distortion occurs to a larger degree than in the conventional plastic window panel 1.

Figure 10:
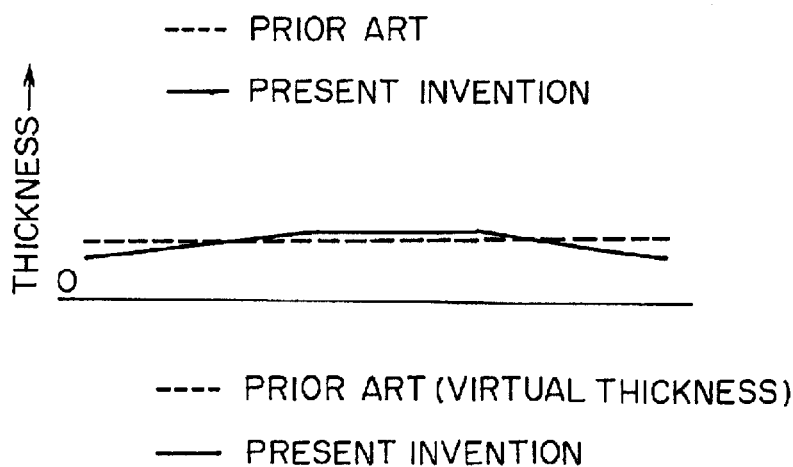
FIG. 10 is a graph in which this embodiment is compared with a conventional plastic window panel in terms of thickness.

FIG. 10 shows the plastic window panel 40 of this invention as compared with the conventional plastic window panel in terms of thickness.

The plastic window panel 40 indicated by the solid line in FIG. 10 is gradually tapered from the central portion 40c toward the peripheral edge portion 40a. In order that the distortion in the central portion may not exceed the distortion limit as a result of the tapering, the thickness of the central portion is larger than the thickness of the conventional plastic window panel, that is, the requisite virtual thickness for maintaining a predetermined face rigidity in the central portion in the case of a uniform thickness, whereas the peripheral portion is relatively thin. Since it is possible to reduce the thickness in the peripheral portion, which occupies a larger area than the central portion, the plastic window panel 40 can be produced with less material than the conventional plastic window panel of a uniform thickness, which means a reduction in cost and weight can be achieved.

In this way, the central portion, where the face rigidity is lowest, is made relatively thick, and continuous tapering is effected toward the peripheral portion, where the face rigidity is relatively high, whereby it is possible to ensure the requisite face rigidity, reduce the amount of material, and achieve a reduction in cost and weight.

Further, in the effective view portion of the plastic window panel 40, the thickness is varied not abruptly but gradually, so that no distortion of the view is involved.

While in this embodiment the present invention is applied to an automotive sun roof, this should not be construed restrictively. The present invention is also applicable to the wind shield, rear window, and side window of an automobile.

It is not always necessary for the front surface 40d of the plastic window panel 40 to form a curved surface of a single radius of curvature. It is also possible to form the front surface 40d of a plurality of curved surfaces of different radii of curvature smoothly connected together. Similarly, it is not always necessary for the back surface 40e of the plastic window panel 40 to form a curved surface of a single radius of curvature. It is also possible to form the back surface 40e of a plurality of curved surfaces of different radii of curvature smoothly connected together.

What is claimed is:

1. A plastic window panel, comprising:
   a substantially annular mounting portion defined in a peripheral edge portion of the plastic window panel for mounting the panel to a vehicle body;
   a substantially annular, tapered thin-walled portion, arranged nearer to a center of the panel than the mounting portion; and
   a central portion arranged nearer to the center of the panel than the thin-walled portion, a thickness of the thin-walled portion being less than a thickness of the central portion, decreasing continuously between the central portion and the peripheral edge portion.

2. A plastic window panel according to claim 1, wherein the central portion occupies a predetermined area with a uniform thickness and the mounting portion having a smaller thickness than the central portion is formed along the peripheral edge portion.

3. A plastic window panel according to claim 1, wherein the thin-walled portion is formed along the peripheral edge portion of the plastic window panel.

4. A plastic window panel comprising:
   a substantially annular mounting portion defined in a peripheral edge portion of the plastic window panel for mounting the panel to a vehicle body; and
   an effective view portion having a transparent portion defined on an inner side of the mounting portion,
   the effective view portion having a substantially annular peripheral portion, arranged nearer to a center of the panel than the mounting portion and a central portion arranged nearer to the center of the panel than the peripheral portion,
   a thickness of the peripheral portion of the effective view portion being less than a thickness of the central portion of the effective view portion, decreasing continuously between the central portion and the peripheral edge portion.

5. A plastic window panel according to claim 4, wherein both the front surface and the back surface of the effective view portion are equipped with smooth curved surfaces warped in the same direction, the radius of curvature of the back surface being larger than the radius of curvature of the front surface.

6. A plastic window panel according to claim 4, wherein the thickness of the effective view portion varies at a fixed rate in each direction from the central portion toward the peripheral edge portion of the plastic window panel.

7. A plastic window panel according to claim 4, wherein the thickness of the effective view portion reduces continuously from the central portion toward the peripheral edge portion.

8. A plastic window panel, comprising:
   a substantially annular mounting portion defined in a peripheral edge portion of the plastic window panel for mounting the panel to a vehicle body;
   a substantially annular, tapered thin-walled portion, arranged nearer to a center of the panel than the mounting portion; and
   a central portion arranged nearer to the center of the panel than the thin-walled portion, a thickness of the thin-walled portion being less than a thickness of the central portion, decreasing continuously between the central portion and the peripheral edge portion, both a front surface and a back surface of the plastic window panel being equipped with smooth curved surfaces warped in the same direction, a radius of curvature of the back surface being larger than a radius of curvature of the front surface.

9. A plastic window panel, comprising:
   a substantially annular mounting portion defined in a peripheral edge portion of the plastic window panel for mounting the panel to a vehicle body;
   a substantially annular, tapered thin-walled portion, arranged nearer to a center of the panel than the mounting portion; and
   a central portion arranged nearer to the center of the panel than the thin-walled portion, a thickness of the thin-walled portion being less than a thickness of the central portion, decreasing continuously between the central portion and the peripheral edge portion, a thickness of the substantially annular, tapered thin-walled portion varying at a fixed rate in each direction from the central portion toward the peripheral edge portion of the plastic window panel.

\* \* \* \* \*